(12) United States Patent
Dhawan

(10) Patent No.: US 7,277,546 B2
(45) Date of Patent: Oct. 2, 2007

(54) METHODS AND APPARATUS FOR MULTI-LEVEL DYNAMIC SECURITY SYSTEM

(75) Inventor: Atam P. Dhawan, Randolph, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 296 days.

(21) Appl. No.: 10/822,219

(22) Filed: Apr. 9, 2004

(65) Prior Publication Data

US 2004/0223615 A1 Nov. 11, 2004

Related U.S. Application Data

(60) Provisional application No. 60/461,636, filed on Apr. 9, 2003.

(51) Int. Cl.
*H04L 9/00* (2006.01)
(52) U.S. Cl. .................... 380/269; 380/40; 380/42; 380/255; 380/261; 713/168; 713/176
(58) Field of Classification Search .............. None
See application file for complete search history.

(56) References Cited

U.S. PATENT DOCUMENTS 5,687,191 A * 11/1997 Lee et al. ................. 375/216
6,505,299 B1 * 1/2003 Zeng et al. ................ 713/160

2003/0128845 A1 * 7/2003 Kudumakis ................. 380/210

FOREIGN PATENT DOCUMENTS

WO WO PCTUS04/10869 8/2006

OTHER PUBLICATIONS

Pommer, A., et al, 'Selective encryption of wavelet packet subband structures for secure transmission of visual data', Dec. 2002, Multimedia & Security Workshop, ACM Multimedia, pp. 67-70, entire document, http://www.ganesh.org/publ/papers/2002/Pommer02b.pdf.*
Alattar, A., et al, 'Improved selective encryption technique for secure transmission of MPEG video bit-streams', 1999, IEEE Signal Processing Society, Proceedings of the 1999 IEEE International Conference on Image Processing (ICIP'99), entire document, http://ieeexplore.ieee.org/iel5/6632/17687/00819590.pdf.*
Roshan K. Thomas et al., A Trusted Subject Architecture for Multilevel Secure Object-Oriented Databases, IEEE Transactions on Knowledge and Data Engineering, Feb. 1996, pp. 16-31, vol. 8, No. 1.

(Continued)

*Primary Examiner*—Nasser Moazzami
*Assistant Examiner*—Ronald Baum
(74) *Attorney, Agent, or Firm*—Kaplan Gilman Gibson & Dernier LLP; Matthew B. Dernier

(57) ABSTRACT

Methods and apparatus for converting original data into a plurality of sub-bands using wavelet decomposition; encrypting at least one of the sub-bands using a key to produce encrypted sub-band data; and transmitting the encrypted sub-band data to a recipient separately from the other sub-bands.

26 Claims, 7 Drawing Sheets

OTHER PUBLICATIONS

Richard Graubart, The Integrity-Lock Approach To Secure Database Management, IEEE Symposium on Security and Privacy, 1984, pp. 62-74.

Bhavani Thuraisingham et al., Security Constraint Processing In A Multilevel Secure Distributed Database Management System, IEEE Transactions on Knowledge And Data, Engineering, Apr. 1995, pp. 274-293, vol. 7, No. 2.

Wen-Pai Lu, et al., A Model For Multilevel Security In Computer Networks, IEEE Transactions on Software Engineering, Jun. 1990, pp. 647-659., vol. 16, No. 6.

Richard A. Griffith et al., Designing & Operating A Multilevel Security Network Using Standard Commercial Products, csrc.nist.gov/nissc/1996/papers/NISSC96/paper037/sctycon2.pdg.

Vijayalakshmi Atluri et al., Multilevel Secure Transaction Processing: Status and Prospects, Database Security, X: Status and Prospects, Chapman & Hall (1997), pp. 1-20.

http://www.disa.mil/, p. 1.

International Preliminary Report of PCT/US04/10869 of Sep. 26, 2006 by New Jersey Institute of Technology.

* cited by examiner

METHODS AND APPARATUS FOR MULTI-LEVEL DYNAMIC SECURITY SYSTEM

CROSS REFERENCE TO RELATED APPLICATIONS

This application claims the benefit of U.S. Provisional Patent Application No. 60/461,636, entitled MULTI-LEVEL DYNAMIC COMPUTER DATA SECURITY SYSTEM, filed Apr. 9, 2003, the entire disclosure of which is hereby incorporated by reference.

BACKGROUND OF THE INVENTION

The present invention relates to methods and apparatus for providing multiple levels of security in connection with the transmission of data from a source to a recipient.

As the Internet and Intranet communication dominates various application domains in government, business, industry and military area of interest, keeping both the data and the communication secured is becoming a growing challenge. As systems are more widely distributed, and the more extensively the Internet is used, the greater are the number of threats to the information traversing the Internet. The subversion of a single client or server may provide an attacker with immediate connectivity to the information and computing resources of an entire organization. This problem may only be addressed through a wide array of mechanisms and strategies to protect operating systems, sensitive data and databases, networks and transmission equipment. Unfortunately, the security problem has not heretofore been satisfactorily addressed.

Multi-Level Security (MLS) has been defined in the art as a class of systems containing information with different sensitivities that simultaneously permits access by users with different security levels without risk of compromising the sensitive data. The Defense Information System Agency (DISA) home page (http://www.disa.mil) defines Multi-Level Security as:

Allowing information about different sensitivities (classifications) to be stored in an information system;

Allowing users having different clearances, authorizations, and need to know the ability to process information in the same system; and Preventing users from accessing information for which they are not cleared, do not have authorization, or do not have a need to know [2].

The research on Multi-Level Security technology has been ongoing for many years. Multi-Level Security Systems overcome the operational limitations imposed by system-high operations and are conventionally considered the most secure and effective systems. The biggest advantage of an MLS System is that it allows users at each security level to receive appropriate information and multimedia updates in real time, which would be difficult without this architecture. In an MLS System, each user has the data that is appropriate for his/her security level. MLS guards and MLS workstations can be used to bridge security boundaries between existing single-level systems. MLS operating systems, MLS database management systems, and MLS networks can provide common data processing and data transfer platforms to serve as the foundation for MLS systems.

MLS Operating Systems were developed in the early 1980s and began to receive National Security Agency (NSA) evaluation in 1984. MLS operating systems provide complete mandatory and discretionary access control, thorough security identification of data devices, rigid control of transfer of data and access to devices, and complete auditing of access to the system and data. By implementing an MLS operating system, a security administrator is able to configure security clearance definitions and limitations, permitted special operational capabilities, file access control lists, and choice of password protection schemes. MLS operating systems provide security mechanisms and services that allow a computer system to distinguish and separate classified data and protect it against a malicious user's abuse of authority, direct probing, and human error. MLS operating systems lower the security risk of implementing a system that processes classified data. They also implement security policies and accountability mechanisms in an operating system package. A security policy is the rules and practices that determine how sensitive information is managed, protected, and distributed. Accountability mechanisms are the means of identifying and tracing who has had access to what data on the system so they can be held accountable for their actions.

An MLS Database Management System is designed to archive, retrieve and process information in compliance with certain mandatory security requirements that protect sensitive information from unauthorized access, modification and abuse. Conventional database management systems treat all data at the same security level and ignore different security levels of the data they store and retrieve. Multi-Level Secure Database Management schemes maintain a collection of data with mixed security levels. The access mechanisms allow users or programs with different levels of security clearance to operate only the data appropriate to their level.

Since 1975, research effort have been focused on the development of MLS Database Management System, where many architectures have been proposed, such as the trusted subject architecture, the integrity lock architecture, the kernelized architecture, the replicated architecture, and the distributed architecture. These architectures are more fully discussed in the following publications, which are hereby incorporated by reference in their entireties: Roshan K. Thomas, Ravi S. Sandhu, "A Trusted Subject Architecture for Multilevel Secure Object-Oriented Databases," Transactions on Knowledge and Data Engineering of IEEE, Vol. 8, No. 1 (February 1996); Richard Graubart, "The Integrity-Lock Approach to Secure Database Management," IEEE Symposium on Security and Privacy, p. 62 (1984); and Bhavani Thuraisingham, William Ford, "Security Constraint Processing in a Multilevel Secure Distributed Database Management System," Transactions on Knowledge and Data Engineering of IEEE, pp. 274-293 (1995). These differing architectures suit different needs. For example, the Trusted Subject architecture is best for applications where the trusted operating system and the hardware used in the architecture already provide an assured, trusted path between applications and the MLS Database Management System. The Integrity Lock architecture provides the ability to label data down to the row (or record) level, the ability to implement a wide range of categories, and is easiest to validate. The Kernalized architecture scheme is economical and easier to implement for MLS Database Management System with more simple table structures. The Distributed architecture is best suited for MLS Database Management System where physical separation of data by security level is required.

Due to the distributed nature of the network architecture, the high degree of openness of the network medium and the intensive need for sharing resources within the network, the protection mechanisms residing in the individual computers that prevent unauthorized access to the files become inadequate to ensure the security of communications across the network. In the MLS Network, the enforcement mechanism is embedded in the network interface devices, network front-end processors, switches, routers and gateways to enforce the security policy for the network, handling information at different security classification levels and serving users with different security clearances. It controls the access to network equipment for which some users may not have the clearance to use, and it controls the flow of information between various network devices to prevent unauthorized dissemination. Further details concerning the MLS Network are discussed in the following publication, which is hereby incorporated by reference in its entirety: Wen-pai Lu, "A Model for Multilevel Security in Computer Networks," IEEE Transactions on Software Engineering, Vol. 16, No. 6 (June 1990).

An implementation of an MLS Network is discussed in the following publication, which is hereby incorporated by reference in its entirety: Richard A. Griffith & Mac E. McGregor, "Designing & Operating a Multilevel Security Network Using Standard Commercial Products," csrc.nist-.gov/nissc/1996/papers/NISSC96/paper037/sctycon2.pdf. This network has unclassified and secret gateways and routers, where each workstation labels data unclassified or secret and transmits information to the proper gateway and router. Each gateway has an internal unlabeled and multi-level network interface card. The routers act as a firewall, hiding the network from the outside world. Identification and authentication within the MLN is through user identification and password.

In recent years, considerable research has been conducted to develop the concurrency control techniques and commit protocols for Multi-Level Secure Database Management Systems to ensure secure transaction processing. In such databases, transactions and data are labeled as having different security levels. Convert channels can cause leakage of information from one level to another level. Therefore, synchronizing readers and writers in an MLS environment becomes the main concern of secure transaction processing. The concurrency control protocol in Multi-Level Secure Database Management Systems need not only ensure correct execution of transaction, but also prevent the establishment of convert channels.

The secure transaction processing for popular Multi-Level Secure Database Management System architectures, such as kernelized, replicated, and distributed architectures, and advanced transaction models such as workflows, long duration and nested models have been developed. The replicated approach constructs an Multi-Level Secure Database Management System from a single-level Database Management System. The challenge is to design a replica control protocol that will ensure one-copy serializability. The common solution is that transactions are submitted to a global transaction manager, and the global transaction manager routes the transactions to their sites of origin and propagates the update projections to each of the domination containers in turn. For the kernelized architecture, snapshot algorithms have been proposed. A snapshot of data is created and maintained, and transactions read the snapshot. Transactions accessing data at their own level, access the current state of database. A more detailed discussion of existing multilevel secure transaction processing models and the associated technical challenges may be found in the following publication, which is hereby incorporated by reference in its entirety: Vijayalakshmi Atluri, Sushil Jajodia, Thomas F. Keefe, Catherine McCollum, and Ravi Mukkamala, "Multilevel Secure Transaction Processing: Status and Prospects," Database Security, X: Status and Prospects, Chapman & Hall (1997).

A Multi-Level Security Web Server is another emerging trend that allows organizations to maintain a common data set on a single World Wide Web server that connects to multiple security domains/networks. This alleviates the need to maintain multiple servers and data sets, one for each domain or network. It also allows a single, common data resource to support multiple organizations where there is a requirement to restrict access to information based upon organizational or privacy needs. By placing all data on a single MLS Web Server, the time consuming and costly task of maintaining a common and consistent data set on multiple disconnected servers is alleviated.

Using a secure operating system, a secure web server, and secure database technology, information on the server can be segregated and maintained by categories, classification levels, or organizations. Individual users and groups can either be granted or denied access to this information based upon their authorization level, which is assigned by the system's security officer or administrator. Data can be organized hierarchically, if so desired, allowing users to access multiple sets of data and other information at and below their authorization level.

SUMMARY OF THE INVENTION

The present invention is directed to methods and apparatus for providing Multi-Level Dynamic Information Security. These methods and apparatus provide various security services for data and data transmission. In accordance with some embodiments of the invention, an apparatus according to the invention may include two subsystems: a Wavelet Based Multi-Level Dynamic Data Security system for data, and a Multi-Level Dynamic Routing Security system for data transmission.

For very sensitive information, the owner (sender) of data may not want to distribute all the data at one time or to one receiver since to do so would increase the chance for malicious intruders to hijack the data. Instead, the sender may prefer to decompose the data and transmit different pieces of the data to different agents at different time slots through different routes. In this way, the risk of hijacking all the information is significantly reduced because the most the hacker can get is some pieces of the original data.

In accordance with one or more embodiments of the present invention, methods and apparatus provide a tool for decomposing original information into multiple channels, and adding multi-level security mechanisms, including authentication, confidentiality, and integrity, into each channel. In additional embodiments, the present invention provides dynamic performance feedback on a security level chosen by a user, which enables the user to judge whether their security goals are satisfied. In still further embodiments, the present invention provides different security level requirements on intermediate nodes during data transmission, where such intermediate nodes have different security levels, which may be updated dynamically.

In accordance with one or more aspects of the present invention, methods and apparatus provide for: converting original data into a plurality of sub-bands using wavelet decomposition; encrypting at least one of the sub-bands using a key to produce encrypted sub-band data; and transmitting the encrypted sub-band data to a recipient separately from the other sub-bands. Preferably a plurality of the sub-bands are encrypted using respective secret keys to produce respective encrypted sub-band data, where each secret key is the same or different from one of more of the respective secret keys, and the respective encrypted sub-band data are transmitted over at least some differing routes of a packet-switched network to the recipient.

At least one message may be embedded in the at least one sub-band prior to the encryption step. The message may be hashed, digitally signed for, and/or encrypted prior to embedding the at least one message in the at least one sub-band. For example, the message maybe a digital signature, which is transmitted to the recipient to verify the integrity of the encrypted sub-band data.

In accordance with one or more further aspects of the present invention, methods and apparatus provide for: permitting a source entity to make a protocol selection concerning (i) parameters of a wavelet decomposition process to which original data are to be subject to convert the original data into a plurality of sub-bands, and (ii) parameters of an encryption process to which at least one of the sub-bands is to be subject to produce respective encrypted sub-band data; and permitting the source entity to select a respective security level to be associated with the respective encrypted sub-band data; comparing at least one of the protocol selection and selected security level(s) with a database containing data concerning at least one of (i) a probability that the encrypted sub-band data may be broken given the protocol selection, (ii) an association between security levels and protocol selections; and advising the source entity to select at least one of a different security level and a different protocol when a result of the comparison indicates a relatively high probability that the encrypted sub-band data may be broken.

The protocol selection may further include at least one of: (i) parameters of a hashing process to which at least one message is to be subject prior to embedding the at least one message in one or more of the sub-bands, (ii) parameters of a digital signature to which the at least one message is to be subject prior to embedding the at least one message in one or more of the sub-bands, (iii) parameters of an encryption process to which the at least one message is to be subject prior to embedding the at least one message in one or more of the sub-bands, and (iv) aspects of nodes of a packet-switched network through which the respective encrypted sub-band data are to traverse for transmission to a recipient.

Preferably the methods and apparatus provide for: converting the original data into a plurality of sub-bands using the selected parameters of the wavelet decomposition process; encrypting at least one of the sub-bands to produce encrypted sub-band data using the selected parameters of the encryption process; and transmitting the encrypted sub-band data to the recipient as one or more separate packets from the other sub-bands.

It is most preferred that the packet(s) of the encrypted sub-band data are routed to the recipient over trusted nodes of a packet-switched network, each trusted node having a node security level for comparison with the security level(s) associated with the respective encrypted sub-band data, wherein each packet may only be routed through a trusted node having a node security level equal to or higher than the security level associated with the encrypted sub-band data. The node security levels of the trusted nodes are preferably time variant in response to network conditions, and each node is preferably capable of changing its security level in response to the network conditions. Still further, one or more of the trusted nodes are preferably operable to merge two or more packets of the respective encrypted sub-band data into one or more further packets, if the node has a security level equal to or higher than the security level associated with the encrypted sub-band data.

Above, it was noted that Multi-Level Security technology is applied in various fields, including operating systems, database management systems, networks, as well as transaction processing and web servers. The common goals of these secure systems are to protect data from a malicious user, to process data in secure and appropriate means, to deliver data to the correct receiver without releasing any sensitive information, and to improve system efficiency. The Multi-Level Dynamic Information Security methods and apparatus of the present invention are operable for integration into MLS systems as an add-on feature or, they may be implemented as stand-alone applications.

In accordance with one or more further aspects of the present invention, the methods and apparatus described thus far and/or described later in this document, may be achieved utilizing suitable hardware, such as that shown in the drawings hereinbelow. Such hardware may be implemented utilizing any of the known technologies, such as standard digital circuitry, analog circuitry, any of the known processors that are operable to execute software and/or firmware programs, one or more programmable digital devices or systems, such as programmable read only memories (PROMs), programmable array logic devices (PALs), any combination of the above, etc. Further, the methods of the present invention may be embodied in a software program that may be stored on any of the known or hereinafter developed media.

Other aspects, features and advantages of the present invention will become apparent to those skilled in the art when the description herein is taken in conjunction with the accompanying drawing.

BRIEF DESCRIPTION OF THE DRAWING

For the purposes of illustration, there are forms shown in the drawings that are presently preferred, it being understood, however, that the invention is not limited to the precise arrangements and instrumentalities shown.

DETAILED DESCRIPTION OF THE PREFERRED EMBODIMENTS

Figure 1:
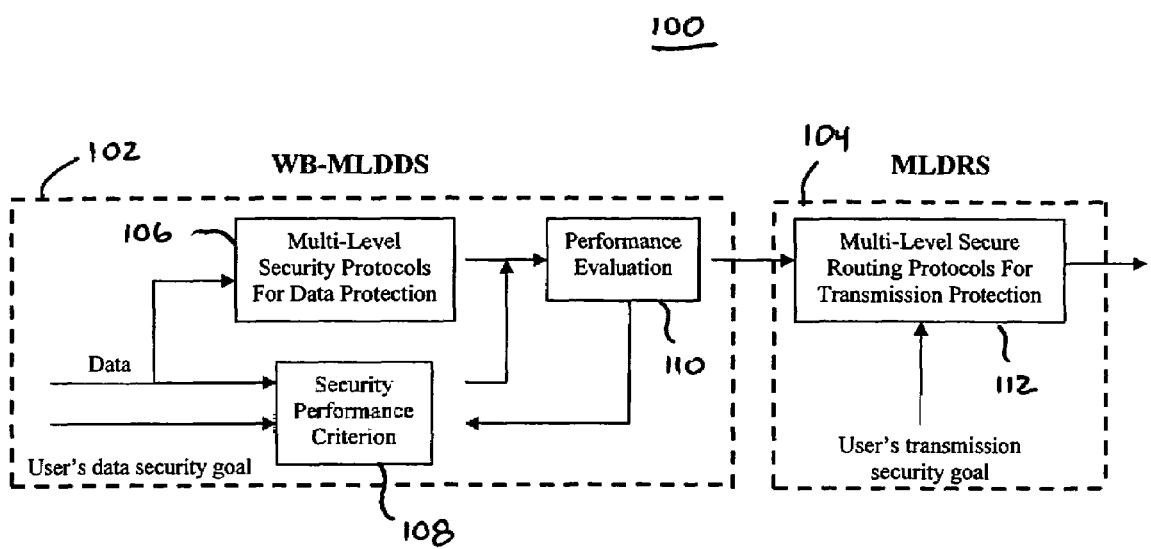
FIG. 1 is a block diagram of a multi-level dynamic data security system in accordance with one or more aspects of the present invention.

With reference to FIG. 1, a block diagram of a multi-level dynamic data security system 100 is illustrated in accordance with one or more aspects of the present invention. The system 100 includes a Wavelet Based Multi-Level Dynamic Data Security (WB-MLDDS) unit 102 and a Multi-Level Dynamic Routing Security (MLDRS) unit 104. The WB-MLDDS unit 102 includes a Multi-Level Security Algorithms for Data Protection (MLSPDP) unit 106, and may additionally include a Security Performance Criterion (SPC) unit 108 and a Performance Evaluation (PE) unit 110.

In operation, a user may input data and a security goal into the MLSPDP 106 and the SPC 108. The input data may be some original pixel domain image, some message data, etc. The security goal may be specified in terms of a level, such as a level between 1 and 10 (although how the level is specified is not critical to the invention). Based on the input data type and the security goal, the MLSPDP 106 provides options for how the data are to be secured and how the data are to be transmitted over a communications network to a recipient. The options include wavelet decomposition methods, decomposition levels, authentication options, watermarking algorithms, digital signature algorithms, and encryption algorithms.

After the user chooses these options, the MLSPDP 106 processes the input data and sends the processed data to the PE 110 to analyze whether the likely security performance will meet the user's security goal. The PE 110 sends the result back to the SPC 108 as an update and, if the user's security goal is likely to be satisfied, the processed data will be passed to the MLDRS 104. A further security goal is input into the MLDRS 104 having to do with how the data are to be transmitted through the network to the recipient. The data are then transmitted through the network to the recipient based on user's transmission security goal. If the likely security performance will not meet the user's security goal, the data may be processed again using a higher-level security protocol.

Figure 2:
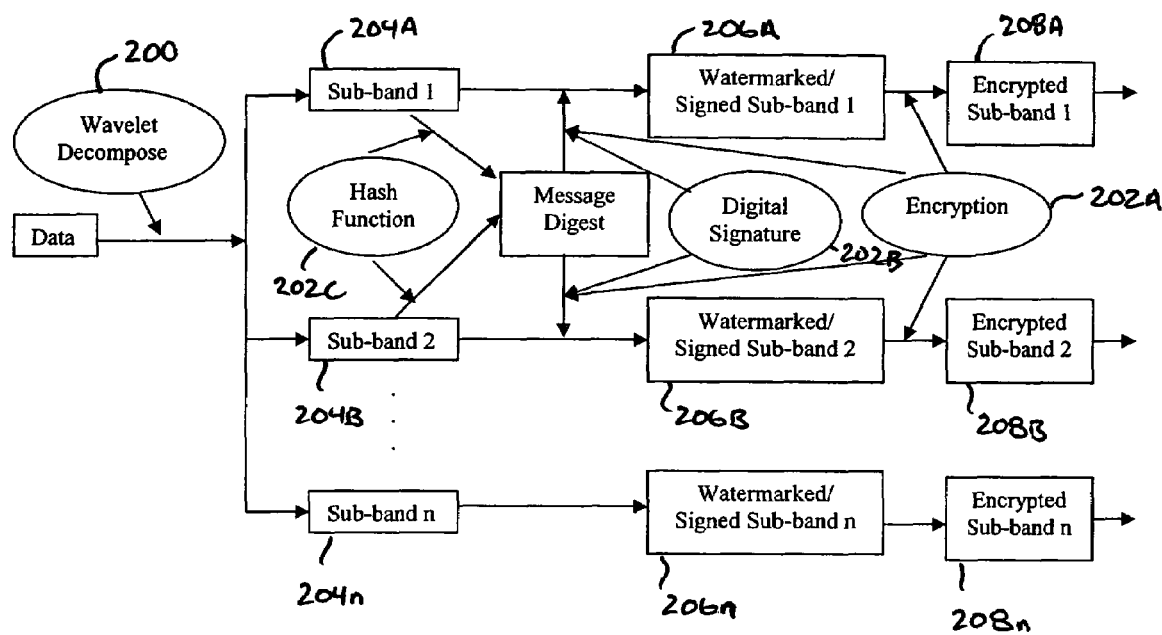
FIG. 2 is a block diagram of the multi-level security protocols for data protection function of the system of FIG. 1.

The above operation will be discussed in more detail with reference to FIG. 2, which is a block diagram of the MLSPDP 106. The MLSPDP 106 includes a wavelet decomposition unit 200 and a cryptography unit 202. The wavelet decomposition unit 200 converts original data into a plurality of sub-bands 204A, 204B, . . . 204n using a wavelet decomposition technique. It is noted that the specific wavelet functions are preferably taken from a library of well-known functions and may be specified by the user or automatically invoked by the system 100. The cryptography unit 202 preferably encrypts at least one of the sub-bands 204A-n to produce encrypted sub-band data. Any of the known cryptographic algorithms may be employed for this purpose, such as transposition, substitution, polyalphabetic substitution, conventional key encryption, public key encryption, cipher systems, code systems, etc. The user may specify the parameters of the encryption process or they may be automatically selected by the system 100.

After at least one of the sub-bands 204A-n (and preferably all) have been encrypted, the encrypted sub-band data are transmitted to a recipient separately from one another over the communications network. This transmission is preferably carried out by packetizing the encrypted sub-band data for transmission over a packet-switched network. This approach yields an improved level of security, which may be satisfactory to meet some security level. Indeed, the user may not want to distribute all the data at one time since to do so would increase the chance for malicious intruders to hijack the data. Instead, the user may prefer to decompose the data and transmit different pieces of the data to different agents at different time slots through different routes. In this way, the risk of hijacking all the information is significantly reduced because the most the hacker can get is some pieces of the original data.

In accordance with one or more further aspects of the present invention, the user may establish different security mechanisms to each of the sub-bands 204A-n. For example, the cryptography unit 202 may include the capabilities to encrypt data (as discussed above), to hash the sub-band data, to apply digital signatures, etc., and these capabilities may be applied to the sub-band data at the discretion of the user in order to meet his/her security goal. An additional security measure may include hashing one or more of the sub-bands 204A-n prior to (or instead of, encryption.

Figure 3:
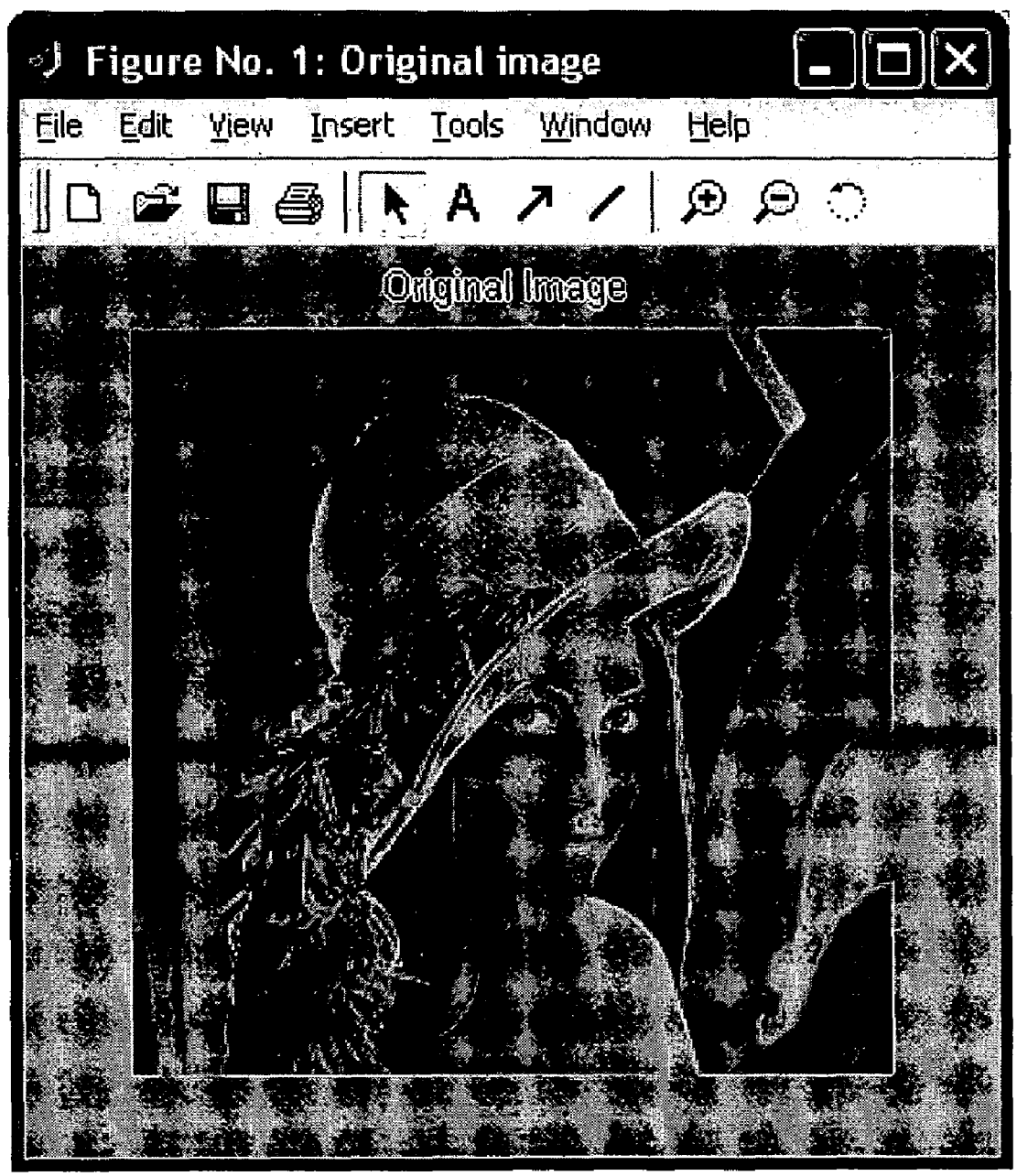
FIG. 3 is an illustration of a pixel domain image that is suitable for use in connection with the system of FIG. 1.

Another security measure may be to use the original data, such as a pixel image, as a container for carrying a sensitive message. FIG. 3 illustrates a pixel domain image (the well-known Lana image) that is suitable for use in this regard. The message may be any information, such as straight text, cipher text, a digital signature, etc. For example, the message may be the following text string:

E0CD3A988C89D3FDFA4C65F57FBBD74CB0C54B1A38293ADC1E

35A

D8216798BFA5EF998A97AB90FF01F68BD46C335285435F33C7

CBCAFA

BBB3DE48A826C87374BE3520A7E2D91E20156C043D214B41A3

DD860CBB046B560CD

Figure 4:
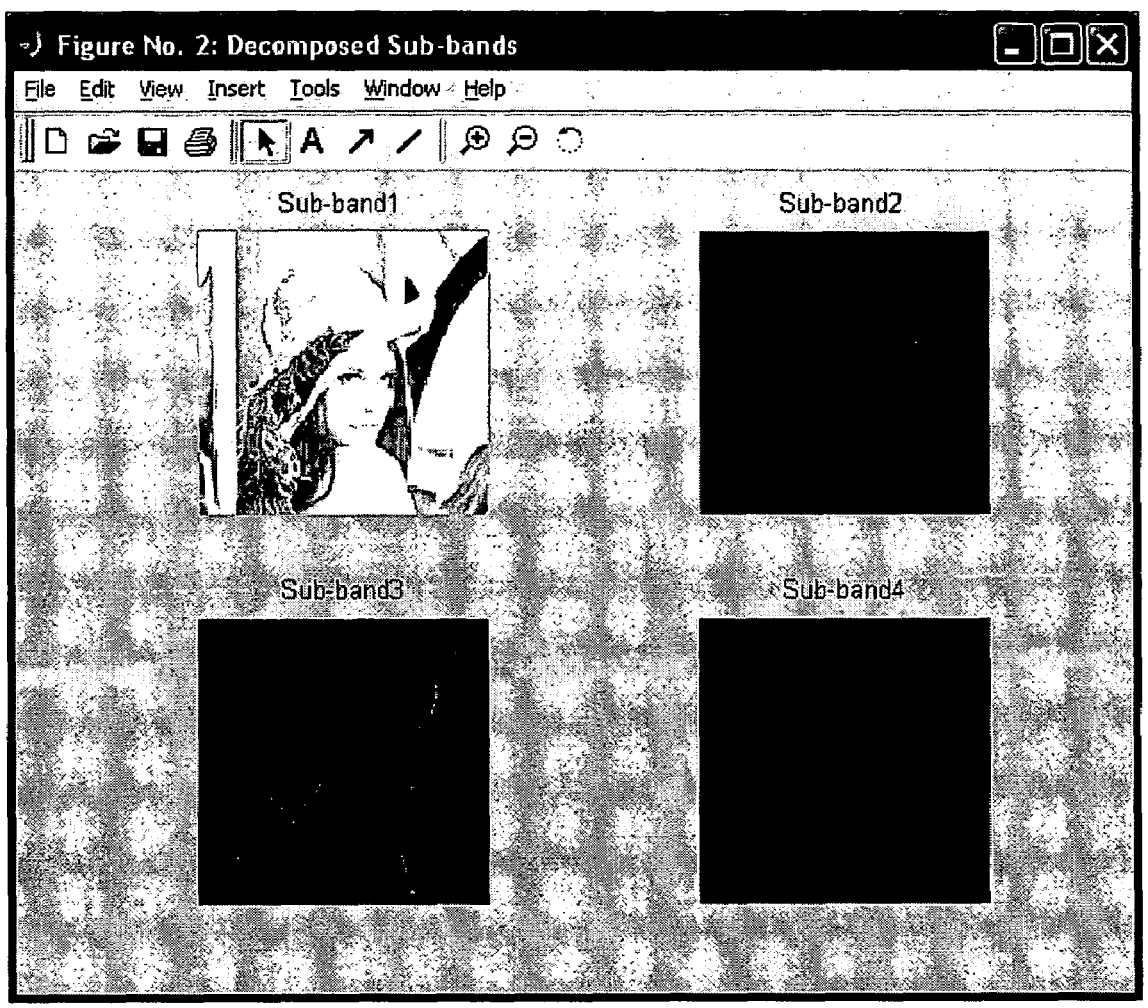
FIG. 4 is an illustration of the sub-band images that result from the pixel domain image of FIG. 1 when a wavelet decomposition process is applied to the image in accordance with one or more aspects of the present invention.
Figure 5:
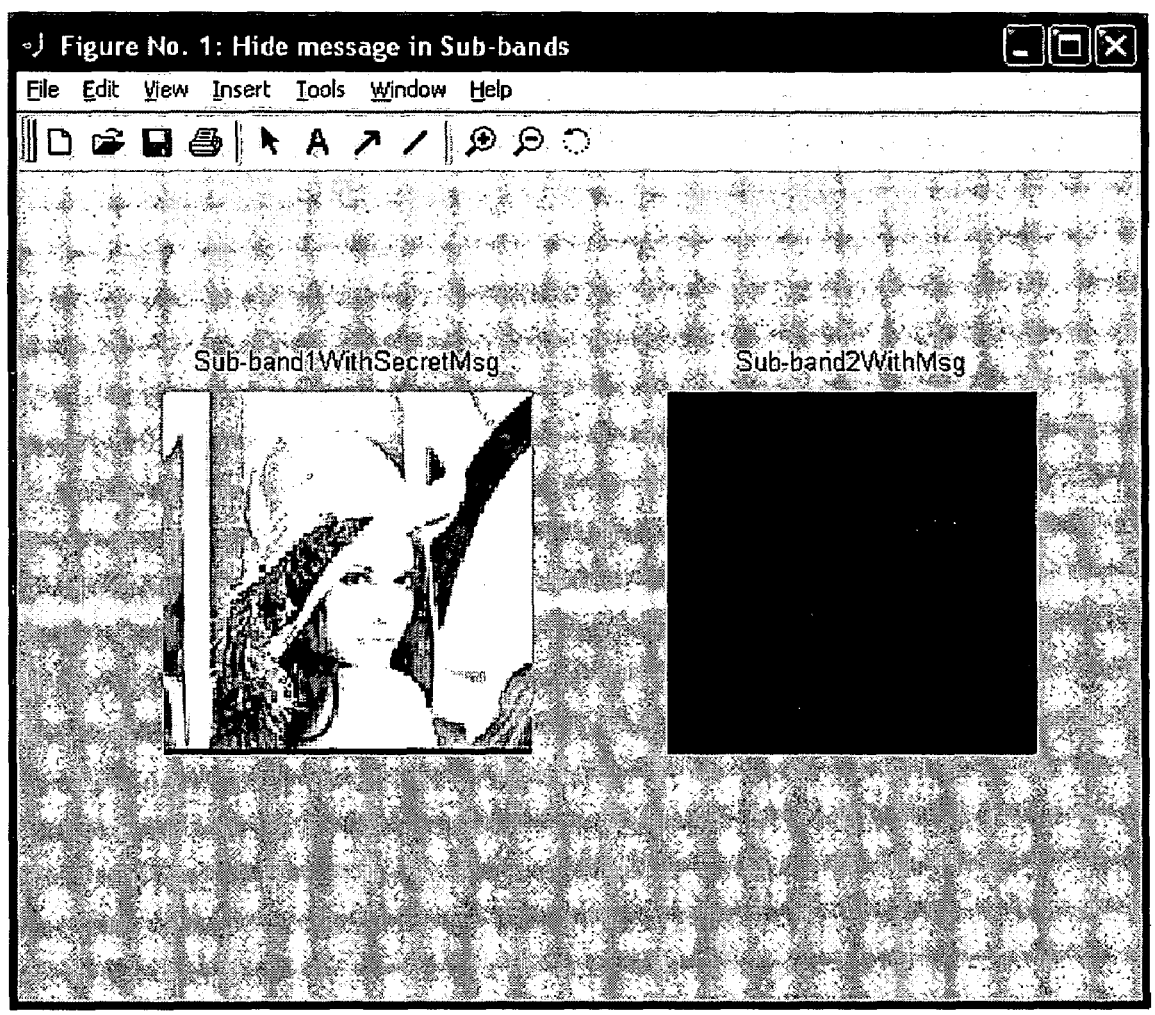
FIG. 5 is an illustration of the first and second sub-band images of FIG. 1 that have been embedded with message data in accordance with one or more aspects of the present invention.

This is message may be embedded in whole or in part into one or more of the sub-bands sub-bands 204A-n by way of a message digest. With reference to FIG. 4, the sub-band image that result from a level 1 wavelet decomposition of the Lana image are illustrated. The message may be embedded in one or more of the sub-bands 204, as illustrated in FIG. 5. The message may be encrypted with a secret key (shared between sender and recipient) and the encrypted message may be signed with sender's private key. In addition (or alternatively), the digital signature may be embedded in the sub-band 204 as watermark or be appended at the end of the given sub-band.

Figure 6:
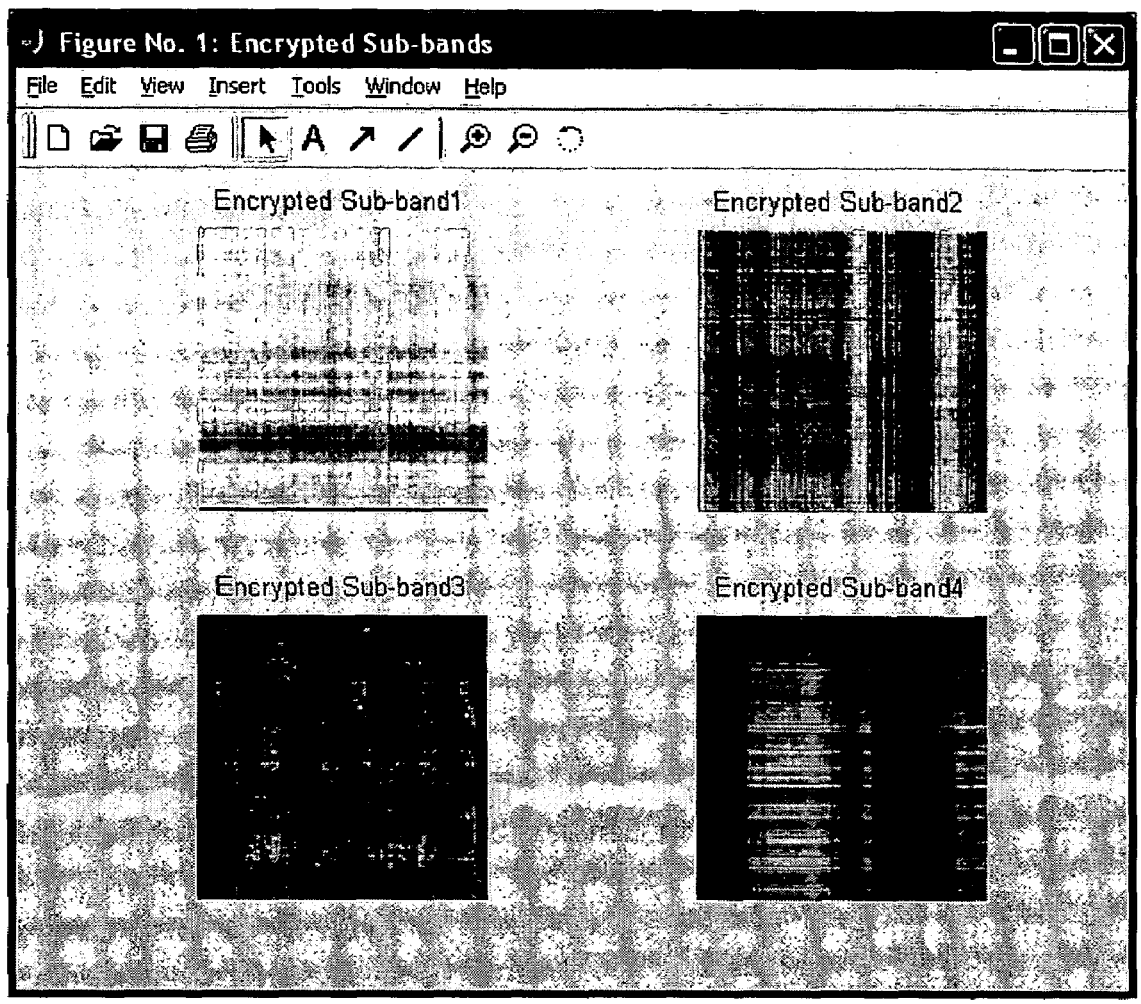
FIG. 6 is an illustration of the sub-band images from the pixel domain image of FIG. 1 after the respective sub-band images have been encrypted in accordance with one or more aspects of the present invention.

As illustrated in FIG. 6, the one or more signed and/or watermarked sub-bands 206A-n crypted via the cryptography unit 202 (preferably with a secret key) to produce the encrypted sub-band data 208A-n. It is noted that the two secret keys, employed in each sub-band and shared between the sender and the recipient, may be the same or different, and may be established by way of the user's selected security goal.

Among the features of certain aspects of the present invention, the wavelet decomposition is employed as a means to implement multilevel security schemes, instead of its traditional role as only a method of compression. In different security levels, different cryptographic algorithms are enabled to meet the user's security goal. Once the user's security goals are initially defined, performance evaluation may be applied to help the user to check if his/her security goal is likely to be successful.

In this regard, the PE 110 consists of a database and comparison process that compares the protocol selection (by the user and/or by the system 100), the selected security level(s), and/or a probability that the encrypted sub-band data may be broken given the protocol selection. For example, if the user selects a security level of 10 (e.g., the highest level of security) but specifies weak security protocol (e.g., weak encryption of watermarked message data), the PE 110 may advise the user to select at least one of a different security level and a different protocol.

It is noted that these protocols may include the parameters discussed thus far and/or: (i) parameters of a wavelet decomposition process to which original data are to be subject to convert the original data into a plurality of sub-bands, (ii) parameters of an encryption process to which at least one of the sub-bands is to be subject to produce respective encrypted sub-band data; (iii) parameters of a hashing process to which at least one message is to be subject prior to embedding the at least one message in one or more of the sub-bands, (iv) parameters of a digital signature to which the at least one message is to be subject prior to embedding the at least one message in one or more of the sub-bands, (v) parameters of an encryption process to which the at least one message is to be subject prior to embedding the at least one message in one or more of the sub-bands, and (vi) aspects of nodes of a packet-switched network through which the respective encrypted sub-band data are to traverse for transmission to a recipient.

The database of the PE 110 is preferably established by way of simulated data and/or empirical data. For example, various security protocols may be tested (by way of different attack protocols) for their resistance to hackers and their abilities to meet the different security levels. Further, the various security protocols may be tested in the field by recording the results of actual attacks by hackers and their abilities to meet the different security levels.

Turning again to FIG. 1, the MLDRS 104 establishes the security protocol used to transmit the data through the communications network to the recipient. Routing is the heart of the communication network's infrastructure. Current routing protocols are only able to deal with simple network failure such as links going down or nodes crashing. Lack of security in routing leaves the network vulnerable to malicious intruders. In accordance with one or more further aspects of the present invention, a secure routing protocol is provided in order to promote the confidentiality and integrity of sensitive routing information, to avoid the disclosure of network traffic and to protect network resources.

One or more aspects of the secure routing protocol of the present invention is based on the Security-Aware Routing (SAR) model, in which the nodes in a network have different security attributes and are classified into different trust levels. In accordance to the SAR model, the nodes having the same trust level share a secret key and routing is accomplished between nodes that match particular security attributes and trust levels. Security metrics are embedded into the routing request packets, and change the forwarding behavior of the protocol with respect to routing request packets. All routing request packets and routing reply packets are encrypted by the keys shared in the same level. Only nodes that provide the required level of security can generate or propagate route requests, updates, or replies.

Figure 7:
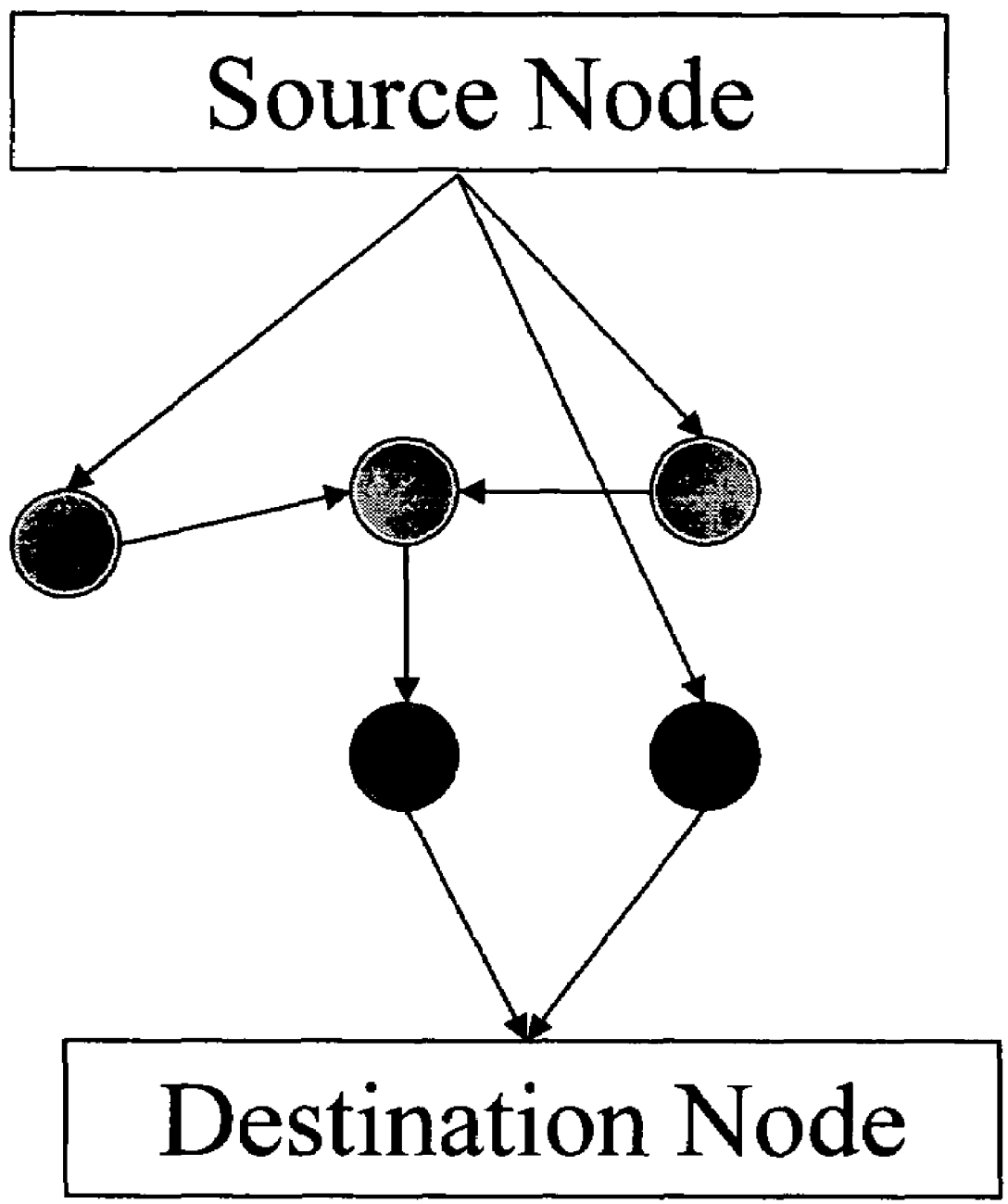
FIG. 7 is a block diagram of a communications network having a plurality of trusted nodes through which the encrypted sub-band images may be transmitted to a recipient.

Various aspects of the secure routing protocol of the present invention, however, address two primary problems with the SAR model, namely, the problem of distributing keys to nodes of the same trust level; and the problem of having fixed trust levels. These two problem result in nodes that are very vulnerable to attack. Thus, in accordance with aspects of the present invention, the MLDRS 104 employs different keys, which may be one-time generated keys. This enhances security under highly changing network conditions. With reference to FIG. 7, the trusted nodes of the network include a security level evaluator, which is operable to compute a metric by evaluating the recent behavior of a node, and to update its security level according to a predefined threshold. The MLDSR 104 (which may include the trusted nodes of FIG. 7) is capable of assigning multiple trust levels to nodes and updating them to lower and higher values on the basis of performance and security clearance assigned by the user.

Further, lower security level nodes may use higher security level nodes in the routing of data without triggering the higher-level security. In contrast, higher security level nodes do not route through lower security level nodes. In this way, routing efficiency is improved without compromising security. This achieves a multi-level concept in the secure routing of the data.

The MLDSR 104 enables routing the packet(s) of the encrypted sub-band data to the recipient over trusted nodes of a packet-switched network, where each trusted node has a node security level for comparison with the security level(s) associated with the respective encrypted sub-band data. Each packet may only be routed through a trusted node having a node security level equal to or higher than the security level associated with the encrypted sub-band data. The node security levels of the trusted nodes are time variant in response to network conditions, and each node is capable of changing its security level in response to the network conditions. Further, a given node may be operable to merge two or more packets of the respective encrypted sub-band data into one or more further packets if the node has a security level equal to or higher than the security level associated with the encrypted sub-band data.

In this regard, each recipient agent (node) can only access part of the secure data based on its security level by providing correct secret keys and verifying the authentication of the data using sender's public key. By combining all the sub-bands received by various recipient agents, the original data can be recovered. This data processing procedure ensures that data is releasable only to those having authorization, and that only a user who holds the correct secret key can access, derive and check the original data.

MLS technology provides users with different security levels the flexibility of handling data simultaneously, effectively and securely. MLS is a significant technology for command, control, communications, and intelligence systems because it enhances the availability of information while maintaining security. The security aspects of the present invention provides better security protection for both data and communication with multi-level access checkpoints, various options on digital signature/watermarking, dynamic one-time secret key and public key infrastructures, strong encryption algorithms and multi-level secure routing protocols. In addition, the dynamic performance feedback on the data security level chosen by users and dynamic update on security labels of intermediate nodes provides users with more resources to judge whether their security goals will be satisfied. The capabilities of the present invention offer enhanced security and increased effectiveness.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method, comprising:
converting original data into a plurality of sub-bands using wavelet decomposition;
encrypting at least one of the sub-bands using a key to produce encrypted sub-band data; and
transmitting the encrypted sub-band data to a recipient separately from the other sub-bands.

2. The method of claim 1, further comprising embedding at least one message in the at least one sub-band prior to the encryption step.

3. The method of claim 2, wherein the at least one message is at least one of hashed, digitally signed for, and encrypted prior to embedding the at least one message in the at least one sub-band.

4. The method of claim 3, wherein a private key is employed when the at least one message is digitally signed for, and a secret key is employed when the at least one message is encrypted.

5. The method of claim 1, wherein the at least one message is a digital signature, which is transmitted to the recipient to verify the integrity of the encrypted sub-band data.

6. The method of claim 1, further comprising:
encrypting a plurality of the sub-bands using respective secret keys to produce respective encrypted sub-band data, each secret key being the same or different from one of more of the respective secret keys; and
transmitting the respective encrypted sub-band data over at least some differing routes of a packet-switched network to the recipient.

7. A method, comprising:
permitting a source entity to make a protocol selection concerning (i) parameters of a wavelet decomposition process to which original data are to be subject to convert the original data into a plurality of sub-bands, and (ii) parameters of an encryption process to which at least one of the sub-bands is to be subject to produce respective encrypted sub-band data; and
permitting the source entity to select a respective security level to be associated with the respective encrypted sub-band data;
comparing at least one of the protocol selection and selected security level(s) with a database containing data concerning at least one of (i) a probability that the encrypted sub-band data may be broken given the protocol selection, (ii) an association between security levels and protocol selections; and
advising the source entity to select at least one of a different security level and a different protocol when a result of the comparison indicates a probability that the encrypted sub-band data may be broken exceeds a predetermined probability.

8. The method of claim 7, wherein the protocol selection further includes at least one of: (i) parameters of a hashing process to which at least one message is to be subject prior to embedding the at least one message in one or more of the sub-bands, (ii) parameters of a digital signature to which the at least one message is to be subject prior to embedding the at least one message in one or more of the sub-bands, (iii) parameters of an encryption process to which the at least one message is to be subject prior to embedding the at least one message in one or more of the sub-bands, and (iv) aspects of nodes of a packet-switched network through which the respective encrypted sub-band data are to traverse for transmission to a recipient.

9. The method of claim 7, further comprising:
converting the original data into a plurality of sub-bands using the selected parameters of the wavelet decomposition process;
encrypting at least one of the sub-bands to produce encrypted sub-band data using the selected parameters of the encryption process; and
transmitting the encrypted sub-band data to the recipient as one or more separate packets from the other sub-bands.

10. The method of claim 9, further comprising:
encrypting a plurality of the sub-bands using respective secret keys to produce respective encrypted sub-band data, each secret key being the same or different from one of more of the respective secret keys; and
transmitting the packet(s) of the respective encrypted sub-band data over at least some differing routes of the packet-switched network to the recipient.

11. The method of claim 9, further comprising routing the packet(s) of the encrypted sub-band data to the recipient over trusted nodes of a packet-switched network, each trusted node having a node security level for comparison with the security level(s) associated with the respective encrypted sub-band data, wherein each packet may only be routed through a trusted node having a node security level equal to or higher than the security level associated with the encrypted sub-band data.

12. The method of claim 11, wherein at least one of:
the node security levels of the trusted nodes are time variant in response to network conditions; and
each node is capable of changing its security level in response to the network conditions.

13. The method of claim 11, further comprising merging two or more packets of the respective encrypted sub-band data into one or more further packets within a trusted node having a security level equal to or higher than the security level associated with the encrypted sub-band data.

14. An apparatus including a processor operating under the instructions of a software program, the software program causing the apparatus to perform actions, comprising:
converting original data into a plurality of sub-bands using wavelet decomposition;
encrypting at least one of the sub-bands using a key to produce encrypted sub-band data; and
transmitting the encrypted sub-band data to a recipient separately from the other sub-bands.

15. The apparatus of claim 14, further comprising embedding at least one message in the at least one sub-band prior to the encryption step.

16. The apparatus of claim 15, wherein the at least one message is at least one of hashed, digitally signed for, and encrypted prior to embedding the at least one message in the at least one sub-band.

17. The apparatus of claim 16, wherein a private key is employed when the at least one message is digitally signed for, and a secret key is employed when the at least one message is encrypted.

18. The apparatus of claim 14, wherein the at least one message is a digital signature, which is transmitted to the recipient to verify the integrity of the encrypted sub-band data.

19. The apparatus of claim 14, further comprising:
encrypting a plurality of the sub-bands using respective secret keys to produce respective encrypted sub-band data, each secret key being the same or different from one of more of the respective secret keys; and transmitting the respective encrypted sub-band data over at least some differing routes of a packet-switched network to the recipient.

20. An apparatus including a processor operating under the instructions of a software program, the software program causing the apparatus to perform actions, comprising:

permitting a source entity to make a protocol selection concerning (i) parameters of a wavelet decomposition process to which original data are to be subject to convert the original data into a plurality of sub-bands, and (ii) parameters of an encryption process to which at least one of the sub-bands is to be subject to produce respective encrypted sub-band data; and permitting the source entity to select a respective security level to be associated with the respective encrypted sub-band data;

comparing at least one of the protocol selection and selected security level(s) with a database containing data concerning at least one of (i) a probability that the encrypted sub-band data may be broken given the protocol selection, (ii) an association between security levels and protocol selections; and advising the source entity to select at least one of a different security level and a different protocol when a result of the comparison indicates a probability that the encrypted sub-band data may be broken exceeds a predetermined probability.

21. The apparatus of claim 20, wherein the protocol selection further includes at least one of: (i) parameters of a hashing process to which at least one message is to be subject prior to embedding the at least one message in one or more of the sub-bands, (ii) parameters of a digital signature to which the at least one message is to be subject prior to embedding the at least one message in one or more of the sub-bands, (iii) parameters of an encryption process to which the at least one message is to be subject prior to embedding the at least one message in one or more of the sub-bands, and (iv) aspects of nodes of a packet-switched network through which the respective encrypted sub-band data are to traverse for transmission to a recipient.

22. The apparatus of claim 20, further comprising:

converting the original data into a plurality of sub-bands using the selected parameters of the wavelet decomposition process;

encrypting at least one of the sub-bands to produce encrypted sub-band data using the selected parameters of the encryption process; and transmitting the encrypted sub-band data to the recipient as one or more separate packets from the other sub-bands.

23. The apparatus of claim 22, further comprising:

encrypting a plurality of the sub-bands using respective secret keys to produce respective encrypted sub-band data, each secret key being the same or different from one of more of the respective secret keys; and transmitting the packet(s) of the respective encrypted sub-band data over at least some differing routes of the packet-switched network to the recipient.

24. A system, comprising:

a source entity operable to: (i) convert original data into a plurality of sub-bands using a wavelet decomposition process, (ii) encrypt at least one of the sub-bands to produce encrypted sub-band data, and (iii) transmit one or more packets of the encrypted sub-band data to a recipient over a packet-switched network separately from the other sub-bands; and a plurality of trusted nodes within the packet-switched network, each trusted node having a node security level for comparison with a security level associated with the encrypted sub-band data, wherein each packet may only be routed through a trusted node having a node security level equal to or higher than the security level associated with the encrypted sub-band data.

25. The system of claim 24, wherein at least one of:

the node security levels of the trusted nodes are time variant in response to network conditions; and each node is capable of changing its security level in response to the network conditions.

26. The system of claim 24, wherein at least some of the trusted nodes are operable to merge two or more packets of the encrypted sub-band data into one or more further packets when the given trusted node has a security level equal to or higher than the security level associated with the encrypted sub-band data.

* * * * *